Nov. 8, 1955   W. F. PETERSON ET AL   2,723,038
BOAT TRAILER

Filed May 13, 1952   3 Sheets-Sheet 1

INVENTOR
Walter F. Peterson
Frank H. Peterson

BY *Munn Liddy & Nathanson*
ATTORNEYS

Nov. 8, 1955　　　W. F. PETERSON ET AL　　　2,723,038
BOAT TRAILER

Filed May 13, 1952　　　　　　　　　3 Sheets-Sheet 2

INVENTOR
Walter F. Peterson
Frank H. Peterson

BY　*Munn Liddy & Nathanson*

ATTORNEYS

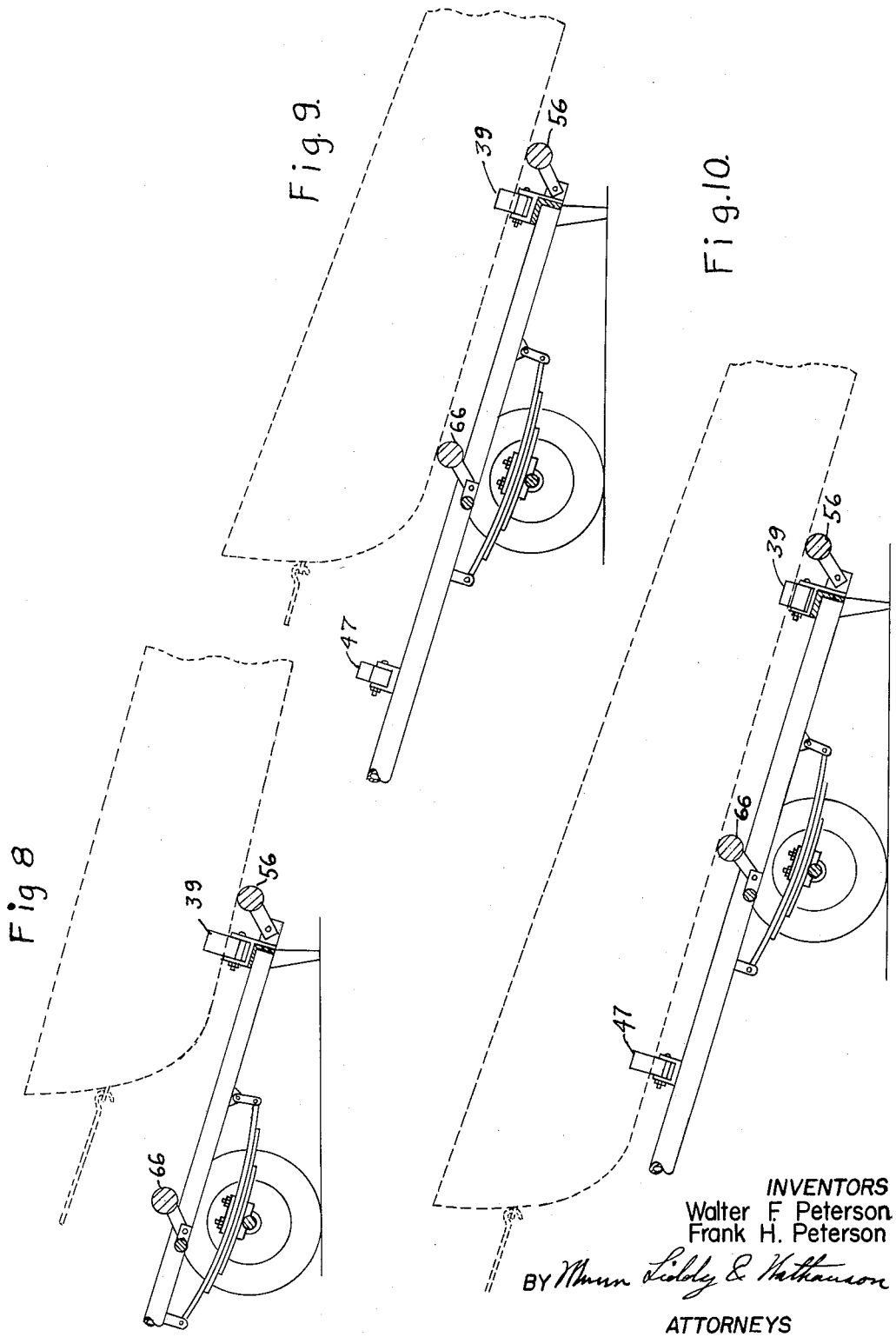

United States Patent Office 2,723,038
Patented Nov. 8, 1955

2,723,038
BOAT TRAILER

Walter F. Peterson and Frank H. Peterson,
Jacksonville, Fla.

Application May 13, 1952, Serial No. 287,460

8 Claims. (Cl. 214—84)

This invention relates to the transportation of boats, and in particular to a boat trailer having improved means for launching and loading boats.

An object of this invention is to provide a trailer which is simply and lightly constructed, yet which is uniquely adapted to the task of loading and launching of a boat.

A further object of our invention is to provide a boat trailer which may be hauled by the ordinary pleasure car having means enabling the launching and loading of boats with considerably less effort and difficulty than heretofore experienced with the previously known trailers of a similar kind.

Still another object of our invention is to provide a boat trailer with which it is possible to launch boats directly into the water and to load boats on the trailer directly from the water without having the disadvantage of dragging the boat on the ground.

Another object of our invention is to provide a boat trailer with means which greatly facilitates launching and loading, with which the launching and loading operations can be accomplished with the trailer on dry land. Thus the trailer need not be subjected to water immersion.

Yet a further object of our invention is to provide a trailer having a means facilitating the launching and loading of boats which also functions as a boat support.

Other objects of our invention include providing a trailer which has means facilitating launching and loading, yet which will properly support a boat, and to provide a trailer in which the load is properly balanced.

These and other objects and advantages will become apparent from the following description of the present invention illustrated in the accompanying drawing, in which:

Figure 8 is a fragmentary side elevational view partly in section and illustrating the loading of a boat on the trailer.

Figure 9 is a view similar to Fig. 8 showing the boat in a different position.

Figure 10 is another view similar to Fig. 8 showing the boat in still another position.

Similar reference characters represent similar parts in the several figures.

Figure 1:
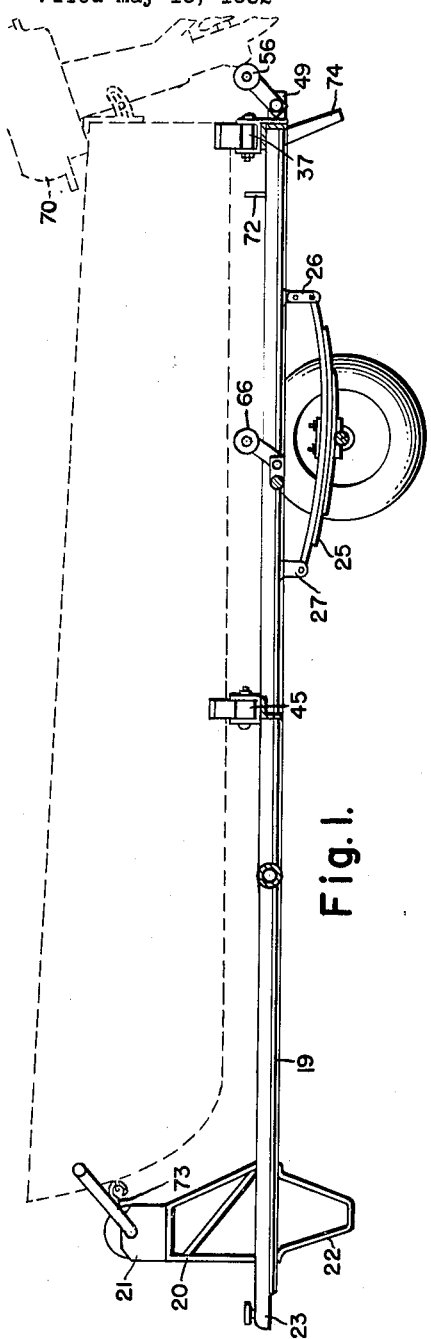
Figure 1 is a sectional elevational view of the trailer showing in dotted lines, a boat mounted thereon.
Figure 2:
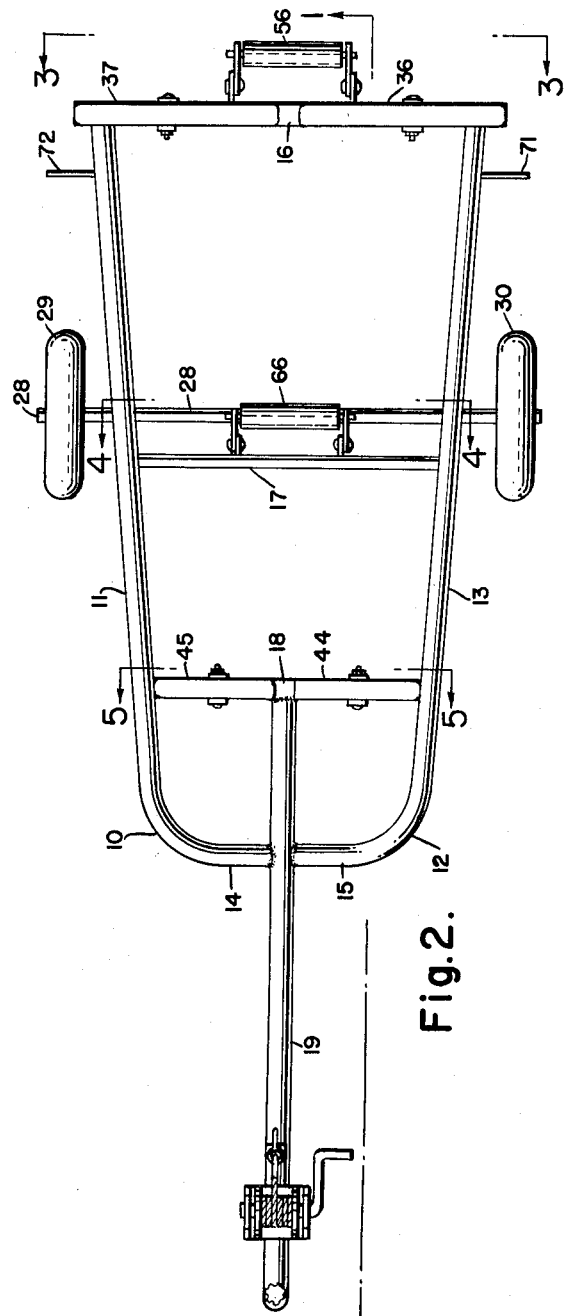
Figure 2 is a plan view of the trailer.

Our invention is designed to make it possible for a single person to load and launch boats without assistance and without the necessity of placing the trailer in the water. Many types of trailers have been devised for carrying boats, and many types of launching and loading gear are employed with such trailers. However, with all such trailers considerable difficulty is experienced in loading and unloading a boat, and two or more persons are needed to safely operate the launching and loading gear. In contrast, our trailer is truly a one-man trailer. Launching and loading can be easily accomplished by one man unassisted.

Another disadvantage common to boat trailers is that many must be immersed in the water for loading or launching. Water immersion in general is detrimental to trailers and results in corrosion, sticky operating parts, etc. This is particularly true where boating is done in salt water. As pointed out heretofore, launching and loading can be easily accomplished with our trailer on dry land.

An element of great importance in the care of a boat is the manner in which it is supported when out of water. Improper supporting results in strain and deformation. It will be seen hereinafter that we have correlated and developed launching and supporting means with which adequate and proper support is obtained.

Another feature of our invention is that we have provided a trailer which eliminates the necessity of removing and replacing outboard motors in loading and launching. With our trailer the motors can be left attached during launching, loading and carrying operations, without damage to the boat or motor. This obviously is a great boon to boating enthusiasts and is particularly important today with the increased use of the new heavier higher horse-power motors.

Referring now particularly to the drawings, 10 indicates a frame element which may be formed of a single tubular member bent so as to have a side portion 11. 12 indicates a complementary tubular member having a side portion 13. Members 10 and 12 have laterally extending front elements 14 and 15. Lateral stiffening and supporting members 16, 17 and 18 interconnect the two frame members 10 and 12. Members 16 to 18 may comprise tubular members welded to the members 10 and 12.

A longitudinal member 19 is secured to cross member 16, and elements 14 and 15 of the side frames 10 and 12. Supported on the forward end of longitudinal member 19 is a winch stand 20 on which is mounted winch 21. A stand bracket 22 is also attached to frame member 19. A trailer hitching device 23 is also provided.

Leaf springs 25 are connected to the frame side bars 11 and 13, through the means of the usual shackles 26 and 27. Axle 28 is connected to the springs in the normal manner and mounts wheels 29 and 30.

Figure 3:
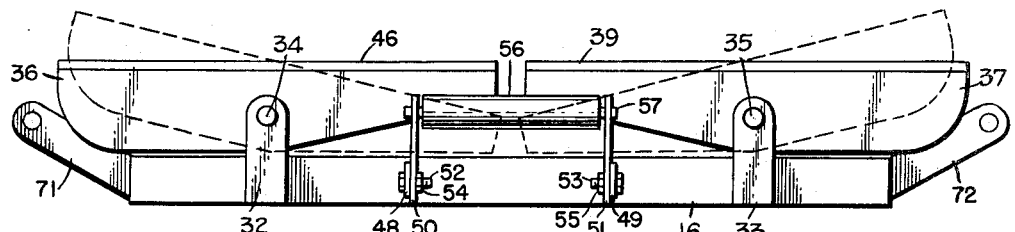
Figure 3 is a fragmentary rear view taken along line 3—3 of Figure 2.
Figure 4:
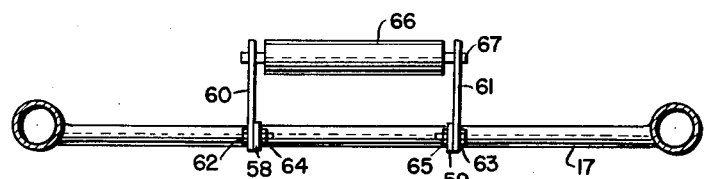
Figure 4 is a sectional elevational view taken on line 4—4 of Figure 2.

As shown in Figure 3, the laterally extending frame member 16 has cradle brackets 32 and 33, welded or otherwise secured thereto. The brackets extend vertically upwardly from the frame stiffening element 16, and have holes drilled therethrough to receive a bolt or pivot pins 34 and 35. Cradles, ways 36 and 37 are pivotally mounted on pins 34 and 35, respectively. The cradles are made of wood or other suitable material, and are provided with suitable padding 38 and 39 for engagement with the hull of a boat. The cradles are pivotally mounted at or near their centers and are, as shown in the drawing, suspended a sufficient distance above the cross member 16 to permit pivoting of the cradles to conform to the contour of a boat to be mounted thereon.

Figure 5:
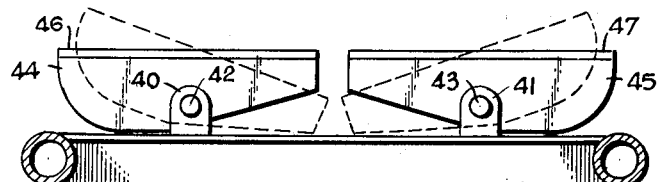
Figure 5 is a sectional elevational view taken along line 5—5 of Figure 2.

As shown in Figure 5, frame cross element 18 likewise has cradle support brackets 40, 41, which receive pins 42 and 43 for pivotally mounting cradles or ways or chocks 44 and 45. Cradles 44 and 45 have a suitable padding material 46 and 47, and as shown by dotted lines, can pivot to adjust themselves to the contour of a boat in the same manner as cradles 36 and 37.

It should be noted that the cradles are pivoted at a point intermediate their ends and at a point below their upper hull-engaging surfaces. The cradles also slant upwardly at the inner edges so as to permit the tilting thereof. The cradles are not attached to the trailer by any other means than by their pivotal connections. No springs or clamps are necessary.

The front cradles and the rear cradles form spaced front and rear pairs of cradles. The pivotal axes of the rear cradles are spaced apart laterally of the longitudinal axis of the trailer a greater distance than the pivotal axes of the front cradles. Further, the individual cradle units of the rear pair are of substantially greater length than the forward units. Boats often have greater breadth at their rear and the spacing of the pivotal axes of the rear pair of cradles a greater distance than the pivotal axes of the front pair coupled with the greater length of the rear units gives a broader line of support at the rear of the boat.

Lateral member 16 has flanges 48 and 49 projecting therefrom to which are pivotally secured roller support plates 50 and 51, by means of bolts 52 and 53 and nuts 54 and 55. The roller brackets pivotally support a roller 56 having a shaft 57. By means of the nuts and bolts the position of the roller may be adjusted with respect to the trailer frame. Lateral stiffening member 17 similarly has flanges 58 and 59 projecting therefrom, to which are adjustably attached roller brackets 60 and 61 by means of bolts 62 and 63 and nuts 64 and 65. Roller brackets 60 and 61 pivotally mount roller 66 having a shaft 67. The rollers 56 and 66 may be formed of rubber or other suitable material. Roller 66 can be adjusted with respect to the frame 10 in the same manner as roller 56. The rollers constitute bar-like elements extending laterally of the longitudinal axis of the trailer and are spaced laterally of the longitudinal axis of the pairs of cradles.

Rollers 56 and 66 are disposed laterally along the longitudinal center line of the trailer, and are adapted to contact the keel of a boat during loading and launching operations. The cradles 36, 37 and 44 and 45 are spaced apart sufficiently at their inner ends to permit passage of the keel between the cradles, the cradles being pivotally mounted, and adjust themselves to the contour of the hull of the boat as the boat is moved forwardly or rearwardly on the trailer.

As shown in Figure 1, when the boat is fully loaded on the trailer in position for transporting, the cradles support the boat keel above the roller 66. The rollers facilitate loading and launching of the trailer, but it is desirable that the keel of the boat does not bear against the rollers when the trailer is being transported. For this reason the rollers are positioned as shown in Figure 1. This prevents undue strain on the boat during transportation thereof.

Figure 1 also illustrates the positioning of the chocks 36 and 37 such that the transom can be placed directly over the rearmost chocks. This makes it possible to support the weight of a motor, such as 70, without fear of damaging the transom. The motor shaft housing or weed guard can be placed directly against the roller 56 and lashed thereto, to prevent bouncing.

Brackets 71 and 72 are provided to attach a belt or other means for lashing the boat in position. Winch 21 may be geared, as desired, and is provided with a cable having a hook 73 for attachment to an eye fastened to the boat. The chocks and rollers are positioned so as to give proper balance, and the balancing is such that the trailer can be easily lifted from its hitch. When the motor has been removed, the boat is positioned rearwardly of the position shown in Figure 1 for proper load distribution.

The cradles and rollers are so positioned that as the boat moves rearwardly in unloading, the keel will contact the rollers after the boat has moved a short distance and the rollers will greatly facilitate the launching. When the boat is to be loaded on the trailer, the trailer is backed adjacent the water. The hook 73 is attached to the boat, and the winch is wound so as to reel-in the cable. The prow of the boat initially strikes the roller 56, and through properly manipulating the trailer the hull is guided so that the keel advances between the chocks 36 and 37.

As the boat advances upwardly onto the trailer, the keel next contacts roller 66 and the hull finally contacts cradles 44 and 45. The trailer is, of course, pivoted on its wheels so that the rear end contacts the ground during launching and loading operations. A depending prong 74 may be provided to be thrust into the ground to assist in preventing movement of the trailer during launching and loading.

Figure 6:
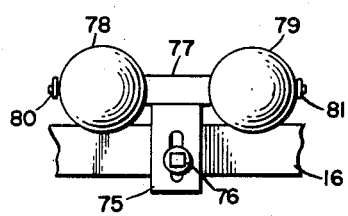
Figure 6 is a view showing a modified form of roller which may be employed with our invention.

Figure 6 illustrates a modified form of roller which may be adjustably secured to rear cross brace 16 or intermediate brace 17 by a flanged bracket 75 and nut and bolt 76. The roller comprises a shaft 77 attached to bracket 75 having two balls 78 and 79 pivotally secured thereto by means such as washers 80 and 81.

Figure 7:
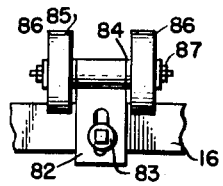
Figure 7 is an elevational view showing another modified form of roller which may be employed in our invention.

Figure 7 shows another form of roller which may be secured to braces 16 or 17 by bracket 82 and nut and bolt 83. The bracket may be provided with a shaft 84 pivotally mounting rollers 85 and 86. The rollers may be held in position by any suitable means such as nuts 87. With the use of the rollers 78 and 79 and 85 and 86, the keel does not directly contact the rollers. The rollers engage the hull immediately adjacent the keel and since there are two points of support instead of one during launching operations, there is less strain on the boat.

Figures 8, 9, 10 and 1 show some of the positions assumed by a boat as it is loaded on to the trailer. In Figures 8, 9 and 10 only one cradle of each pair is shown. The trailer is depicted as if it were split along its longitudinal center line. In Figure 8 the boat is shown with the bow supported on the rear roller 56 and the side of the boat engaged with the rear cradles 38 and 39. The stern of the boat is still supported in the water. With the boat positioned intermediate the rear pair of cradles sidewise movement of the boat, due to water currents or wind, will be prevented since the cradles will guide the boat longitudinally up on to the trailer as it is pulled by the winch 21.

In Figure 9 it is seen that the boat has advanced to the position in which it is now supported by rollers 56 and 66. Cradles 46 and 47, however, have not as yet been contacted. The rear pair of cradles are constantly adjusting to the changing contour of the boat. The load, however, is as yet substantially supported by the rollers only with the cradles serving solely as guiding means.

In Figure 10 the boat is shown to have engaged the forward pair of cradles 46 and 47 which now automatically adjust themselves to the contour of the boat as the boat progresses still further on to the trailer. When the boat has reached the position shown in Fig. 1 the cradles through their pivotal camming movement have automatically lifted the load from the rollers. The position of roller 66 with respect to the boat in Fig. 1, has been exaggerated to clearly show the roller out of contact with the boat. It will be understood that the rollers may actually very lightly contact the boat. However, the weight is supported by the cradles when the boat is fully loaded.

From the foregoing description it should be apparent that we have devised a trailer which facilitates loading and launching of the boat, yet which provides adequate support for the boat during transit. Our self-adjusting cradles conform themselves to fit the boat bottom. The adjustable rollers are provided to contact the boat only during launching and loading operations, and thus undue strain during transit is prevented. Both the rollers and the chocks or cradles provide support during loading and launching and the pivotal nature of the connection between the cradles and the frame assists in guiding the boat to proper position on the trailer when loading.

An important feature of our trailer is that the chocks or ways and the rollers are adjustable. The chocks are, as stated heretofore, self-adjusting and will automatically adjust to accommodate boats having any type of bottom, such as V, semi-V, flat or round bottom. The cradles or chocks will automatically adjust for boats having a keel, and for those not having a keel. The rollers are manually adjustable and also can be adjusted to accommodate any of the types of boats known. For this reason any type of boat can be accommodated.

In contrast, all prior known trailers have been designed and built for a particular boat. In order to accommodate a type of boat other than that for which the older trailers were intended, it was necessary to make structural modifications in the trailers. For example, if a boating enthusiast, owner of a trailer, sells his boat and acquires another having a different hull structure, past experience has shown that with the formerly known trailers the owner would have to relocate elements of the launching and loading mechanism, as well as change the positioning and the shape of the chocks or ways, in order to adapt his trailer to a new boat. It is thus apparent that a trailer which can be utlized with any type of boat without being structurally modified is highly desirable. With our trailer the boat owner would merely have to adjust the setting of the rollers when he changes boats.

Another important feature of our trailer, which also is due to the self-adjusting cradles and the rollers, is that a boat can be moved upwardly onto the trailer and downwardly therefrom, without damaging the hull, the keel or the finish. Fixed ways or chocks conform to the contour of the boat only when the boat is in one position on the trailer. Thus, during movement of a boat on a trailer having fixed chocks, the fixed chock will tend to scrape and otherwise damage hull surfaces. In addition, fixed chocks offer considerable resistance to movement. In contrast no damage to the boat will occur through use of our trailer.

In order to accommodate our trailer to any particular boat, the boat is placed on the trailer in the position which it will normally be carried in when moved from place to place without a motor. The rollers are then adjusted so that they are out of contact with, but closely adjacent to the keel or the nearest hull surface. Thus it is seen that during normal carrying, the boat rests solely on the cradles or chocks. This is the only adjustment that need be made. Thus, no structural alteration, such as welding, or the use of different shaped cradles, is required to accommodate our trailer for any particular boat. The trailer is "self accommodating."

When the rollers are thus positioned, the trailer is ready for the operations of launching and loading. To launch the boat, the trailer is tilted upwardly in the front, and the boat given a slight shove. With the rollers adjusted closely adjacent the keel, the boat will be dropped downwardly onto the rollers when the hull is pushed a comparatively short distance. This occurs through the pivotal action of the cradles. When this happens the load is placed on the substantially frictionless rollers, and relieved from the cradles. The boat now rolls easily into the water.

During the rearward movement the cradles gently adjust themselves to the contour of the boat as the boat moves past them.

In loading a boat onto the trailer, the reverse action of the cradles and rollers takes place. Initially, the boat is brought upwardly onto the rear roller 56, and over the rear cradles 36 and 37. Next, the boat will contact roller 66 and finally, cradles 44 and 45. As the boat continues to move forwardly, the cradles continue to adjust themselves to the contour of the boat with the load supported on the rollers.

A wedging or camming action takes place between the cradles and the boat during the advancement of the boat into carrying position. The boat is directed into the position in which it will be finally carried by this wedging action. Also, as the last step, the wedging action of the cradles lifts the boat off of the rollers. When the boat leaves the rollers it moves forwardly only a slight distance to its place of final rest. At this position the load is fully supported by the cradles.

When a motor is to be tied to roller 56, the adjustment of the rollers is somewhat different from that described above. The rear roller adjustment is the same as heretofore described. However, the front roller is adjusted to lie just below its contacting surface of the boat, when the boat is in the position it finally assumes on the trailer for carrying. When the boat is moved upwardly onto the trailer with a motor attached, the transom eventually leaves the rear roller prior to the time the boat reaches its final position. However, the load of the boat will still be carried by roller 66 until the front cradles lift the boat off of the roller 66.

It is understood that additional rollers may be provided and adjusted to perform as described, also, it should be apparent that when the boat moves rearwardly some distance past the trailer mid-point, during launching, the boat will pivot on the roller 56 and roll into the water. At this time the boat will, of course, be partially immersed in water and the load will be taken up by both the water and the trailer.

The cradles and rollers are so designed that launching and loading can be accomplished with amazing ease. For example, as heretofore pointed out, in unloading a boat it is only necessary to raise the tongue of the trailer and give the boat a shove out. The boat will then slide down into the water without any further effort. This illustrates that we have designed a trailer which is truly a one-man trailer.

It is obvious that the frame need not be formed as shown in the drawing, and that the other elements may be modified in design. It is apparent for example, that the trailer may consist of substantially a single longitudinal member having lateral members for supporting wheels and cradles. It is also apparent that one or more rollers may be employed instead of two, which we have shown.

While we have shown and described a preferred form of our invention, it will be understood that variations in details of form may be made without departure from the invention as defined in the appended claims.

We claim:

1. A trailer comprising a frame having pairs of pivoted cradles having upper surfaces for supporting a boat, said cradles each being pivotally connected to said frame at a point intermediate their ends and below their upper surfaces, each cradle of a pair being spaced from the other sufficiently to permit the passage therebetween of the keel of a boat to be supported on said frame, a roller supported on said frame intermediate two pairs of cradles, a second roller adjacent one end of said frame, said rollers extending transversely of said frame and being disposed substantially laterally of a line extending through the spaces between each of the pair of cradles, said upper surfaces normally supporting a boat placed in carrying position on said trailer out of contact with said rollers, the rollers engaging said boat during launching and loading operations.

2. A trailer comprising a frame, spaced pairs of cradles pivotally mounted on said frame and adapted to support a boat thereon, each cradle of a pair being spaced from the other sufficiently to permit the passage of the keel of a boat supported on said trailer therebetween, a roller element supported on said frame between two pairs of cradles, surfaces on said cradles for contacting a boat, a surface on said roller for contacting such a boat, the contact surface on said roller being positioned with respect to the contacting surfaces on said cradles so as to be out of weight supporting contact with a boat when a boat is supported in normal carrying position on said cradles, said cradles being pivotal to lower a boat supported thereon onto said roller during a launching operation.

3. A trailer comprising a frame, a pair of cradles pivotally mounted on said frame and adapted to support a boat thereon, each cradle being spaced from the other sufficiently for the passage therebetween of the keel of a boat supported on said trailer, a roller element supported in spaced relation with respect to said pair of cradles, surfaces on said cradles for contacting a boat, a surface on said roller for contacting such a boat, the contact surface on said roller being positioned with respect to the contacting surfaces on said cradles so as to be out of weight-supporting contact with a boat when a boat is supported in normal carrying position on said cradles, said cradles being pivotal to lower a boat supported thereon onto said roller during a launching operation.

4. A boat trailer comprising a pair of spaced boat supporting cradles pivotally mounted thereon to pivot transversely of the longitudinal axis of said trailer and having upper surfaces adapted to contact a boat, a roller mounted in spaced relation to said cradles and extending transversely of said trailer and intersecting the longitudinal axis thereof, said cradles supporting said boat out of weight-supporting contact with said roller when the boat is in normal carrying position, said cradles and said roller being positioned relative to each other such that the cradles guidingly contact the boat during launching and loading thereof and the roller has weight-supporting contact with the boat during launching and loading.

5. A trailer comprising a frame, spaced pairs of cradles pivotally mounted on said frame having surfaces adapted to supportingly engage the hull of a boat when said boat is in normal carrying position on said trailer, and to guide said boat during launching and loading operations thereof, each of said cradles being pivotal about an axis extending substantially longitudinally of said cradle and intermediate its ends, at least one other boat supporting element fixedly mounted on said frame intermediate said pairs of cradles and comprising a bar-like member, projecting a substantial distance above said frame and extending transversely of the longitudinal axis of said trailer and spaced laterally intermediate the longitudinal axes of said pairs of cradles and being a substantial distance from the spaced pairs of cradles and having a boat supporting contact surface positioned with respect to said cradle surfaces to have weight supporting contact with said boat during launching and loading operations, but being out of said weight supporting contact with said boat when said boat is in a normal carrying position on said trailer, said element being adjustable to vary the fixed position thereof with respect to said cradle surfaces, the portion of the load of the boat carried by said fixed means being automatically transferred by cam-like action of said cradles from said fixed means to said cradles during loading of a boat on said trailer.

6. A boat trailer comprising a frame, spaced pairs of cradles on said frame, said cradles having surfaces for supporting a boat thereon when said boat is in normal carrying position on said trailer, and for guiding said boat during launching and loading operations thereof, said pairs extending laterally of said frame and each cradle of a pair being spaced from the other cradle of a pair, each of said cradles being pivotally connected to said frame, and each being pivotal about an axis extending substantially longitudinally of said frame below the boat contacting surfaces of said cradles and intermediate their ends, and a boat engaging element spaced a substantial distance from said pairs of cradles fixedly connected to said frame and positioned with respect to said cradles for supporting a substantial portion of the weight of said boat during launching and loading, said element comprising a bar-like member projecting a substantial distance above said frame and extending laterally of the longitudinal axis of said trailer and spaced laterally intermediate the longitudinal axes of said pairs of cradles, the portion of the load of a boat supported by said boat engaging element being automatically transferred from said element to said cradles by cam-like action of said cradles during loading of a boat on said trailer.

7. A trailer comprising a frame, spaced pairs of cradles pivotally mounted on said frame having surfaces adapted to support and engage the hull of a boat when said boat is in a normal carrying position on said trailer, said surfaces being adapted to guide said boat during launching and loading operations on to and off of said trailer, each of said cradles being pivotal about an axis extending substantially longitudinally of said frame below its boat contacting surface and intermediate its ends, at least one other boat, supporting element comprising means rotatable about a fixed axis with respect to said cradles and said element further comprising a bar-like member projecting a substantial distance above said frame and extending laterally of the longitudinal axis of said trailer and spaced a substantial distance laterally of the longitudinal axes of said pairs of cradles, said means having a surface positioned with respect to said cradle surfaces to have weight supporting contact with said boat during launching and loading operations, but being out of weight supporting contact with said boat when said boat is in said normal carrying position, the portion of the load of said boat carried by said means during loading operation of the boat being automatically transferred from said means to said cradles by a cam-like action of said cradles as they pivot in adjusting to the contour of the boat as it moves into said normal carrying position.

8. A trailer comprising a frame, spaced pairs of cradles pivotally mounted on said frame having surfaces adapted to supportingly engage the hull of a boat when said boat is in normal carrying position on said trailer, and to guide said boat during launching and loading operations thereof, each of said cradles being pivotal about an axis extending substantially longitudinally of said cradle and intermediate its ends, at least one other boat supporting element fixedly mounted on said frame intermediate said pairs of cradles and comprising a bar-like member projecting a substantial distances above said frame and extending transversely of the longitudinal axis of said trailer and spaced laterally intermediate the longitudinal axes of said pairs of cradles and being a substantial distance from the spaced pairs of cradles and having a boat supporting contact surface positioned with respect to said cradle surfaces to have weight supporting contact with said boat during launching and loading operations, but being out of said weight supporting contact with said boat when said boat is in a normal carrying position on said trailer, said element being adjustable to vary the fixed position thereof with respect to said cradle surfaces, the portion of the load of the boat carried by said fixed means being automatically transferred by cam-like action of said cradles from said fixed means to said cradles during loading of a boat on said trailer, said spaced pairs of cradles forming a forward pair of cradles and a rear pair of cradles, the pivotal axes of the rear pair of cradles being spaced apart a greater distance laterally of the longitudinal axes of said trailer than the pivotal axes of the forward pair of cradles, the rear cradle units being of substantially greater length than the forward units to provide a greater line of boat supporting contact at the rear cradles than at the front cradles.

References Cited in the file of this patent

UNITED STATES PATENTS 2,332,991    Commire    Oct. 26, 1943

(Other references on following page)

UNITED STATES PATENTS

| | | |
|---|---|---|
| 2,405,810 | Berg et al. | Aug. 13, 1946 |
| 2,496,599 | Rivers | Feb. 7, 1950 |
| 2,503,535 | Yarbrough | Apr. 11, 1950 |
| 2,554,398 | Brei | May 22, 1951 |
| 2,558,418 | Brueckman | June 26, 1951 |
| 2,571,213 | Cunningham et al. | Oct. 16, 1951 |
| 2,586,485 | Schroeder | Feb. 19, 1952 |
| 2,608,314 | Krider | Aug. 26, 1952 |
| 2,676,716 | Sallis | Apr. 27, 1954 |